(12) United States Patent
Winters et al.

(10) Patent No.: US 9,092,639 B2
(45) Date of Patent: Jul. 28, 2015

(54) PROCESSING DATA UPDATES WITHIN A DATA MAINTENANCE SYSTEM

(75) Inventors: Christopher J. Winters, Lexington, MA (US); Anthony Yeracaris, Newton, MA (US); Joel Gould, Winchester, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 12/628,969

(22) Filed: Dec. 1, 2009

(65) Prior Publication Data

US 2010/0138383 A1    Jun. 3, 2010

Related U.S. Application Data

(60) Provisional application No. 61/119,148, filed on Dec. 2, 2008.

(51) Int. Cl.
*G06F 7/00* (2006.01)
*G06F 17/00* (2006.01)
*G06F 21/62* (2013.01)
*G06F 17/30* (2006.01)

(52) U.S. Cl.
CPC ........ *G06F 21/6218* (2013.01); *G06F 17/3007* (2013.01); *G06F 17/30091* (2013.01); *G06F 17/30115* (2013.01); *G06F 17/30286* (2013.01); *G06F 17/30557* (2013.01); *G06F 17/30864* (2013.01)

(58) Field of Classification Search
None
See application file for complete search history.

(56) References Cited

U.S. PATENT DOCUMENTS

| | | | |
|---|---|---|---|
| 5,603,002 A * | 2/1997 | Hashimoto | 711/113 |
| 7,113,933 B1 | 9/2006 | Imholte | |
| 7,130,769 B1 * | 10/2006 | Allen et al. | 702/184 |
| 7,315,826 B1 * | 1/2008 | Guheen et al. | 705/7.29 |
| 2001/0039540 A1 * | 11/2001 | Hofmann et al. | 707/3 |
| 2003/0191810 A1 * | 10/2003 | Muhlestein et al. | 709/215 |
| 2005/0050054 A1 | 3/2005 | Clark et al. | |
| 2005/0144189 A1 * | 6/2005 | Edwards et al. | 707/102 |
| 2006/0095466 A1 | 5/2006 | Stevens et al. | |
| 2006/0165012 A1 | 7/2006 | Habetha | |
| 2006/0212612 A1 * | 9/2006 | Takamiya et al. | 710/24 |
| 2007/0100834 A1 | 5/2007 | Landry et al. | |

(Continued)

FOREIGN PATENT DOCUMENTS

| | | |
|---|---|---|
| JP | S61-196339 | 8/1986 |
| JP | S62-219068 | 9/1987 |

(Continued)

OTHER PUBLICATIONS

International Search Report & Written Opinion issued in PCT application No. PCT/US09/66206, mailed Jan. 20, 2010, 7 pages.

(Continued)

*Primary Examiner* — Loan T Nguyen
(74) *Attorney, Agent, or Firm* — Fish & Richardson P.C.

(57) ABSTRACT

Maintaining data in a data management system including at least one processor and a storage system includes accessing a first data source providing one or more source elements of data; accessing a storage system storing one or more subsets of data, each subset including at least one element of data, and storing one or more descriptors identifying a data source for a subset and identifying a data source for each of one or more elements of the subset; and processing rules that determine if, according to the descriptors, an element in the storage system is allowed to be changed.

72 Claims, 8 Drawing Sheets

(56) References Cited

U.S. PATENT DOCUMENTS

| | | | |
|---|---|---|---|
| 2007/0294312 A1* | 12/2007 | Seshadri et al. | 707/200 |
| 2008/0256014 A1 | 10/2008 | Gould et al. | |
| 2008/0281473 A1* | 11/2008 | Pitt | 700/291 |
| 2009/0031006 A1* | 1/2009 | Johnson | 709/218 |
| 2010/0250550 A1* | 9/2010 | Tereposky et al. | 707/741 |

FOREIGN PATENT DOCUMENTS

| | | |
|---|---|---|
| JP | 2006-285571 | 10/2006 |
| JP | 2008-165447 | 7/2008 |
| WO | WO00/29952 | 5/2000 |
| WO | WO2006/132740 | 12/2006 |
| WO | WO2007/083371 | 7/2007 |

OTHER PUBLICATIONS

International Preliminary Report on Patentability, PCT/US09/66206, mailed Oct. 5, 2011, 5 pages.

Chinese Office Action, English translation, Application No. 2009-80146997.9, mailed Nov. 24, 2014, 9 pages.

Japanese Office Action, with English translation, Application No. 2011-539630, mailed Dec. 17, 2013, 5 pages.

Supplementary European Search Report, Application No. EP09830956, Mar. 6, 2014, 7 pages.

* cited by examiner

OVERVIEW

FIG. 2 DESCRIPTORS

FIG. 3 Mapping

FIG. 4 Rules

PLAN CREATION

SEQUENCE OF OPERATION

DELETING RECORDS

PROCESSING DATA UPDATES WITHIN A DATA MAINTENANCE SYSTEM

CROSS-REFERENCE TO RELATED APPLICATIONS

This application claims priority to U.S. Application Ser. No. 61/119,148, filed on Dec. 2, 2008, incorporated herein by reference.

BACKGROUND

This description relates to a data maintenance system.

A modern data maintenance system may receive data from multiple sources. Rather than serve as a simple passive storage mechanism, a data maintenance system may be required to maintain a consolidated repository for the data from the multiple sources, and provide to users of the system a unified view of and single point of access for the entirety of the data. However, consolidating multiple sources of data presents several challenges. Different sources may each contain segments of a logical data collection such as a database, or they may each contain different temporal versions of the same data, such as newly-updated data or outdated data. These sources may all store data in an arrangement or format different from the arrangement or format of the data storage system.

SUMMARY

In a general aspect, a method for maintaining data in a data management system including at least one processor and a storage system includes accessing a first data source providing one or more source elements of data; accessing a storage system storing one or more subsets of data, each subset including at least one element of data, and storing one or more descriptors identifying a data source for a subset and identifying a data source for each of one or more elements of the subset; and processing rules that determine if, according to the descriptors, an element in the storage system is allowed to be changed.

In another general aspect, a system for maintaining data includes a storage system storing one or more subsets of data, each subset including at least one element of data, and one or more descriptors, each identifying a data source for a subset and identifying a data source for each of one or more elements of the subset; a first data source providing one or more source elements of data; a data manager configured to process rules that determine if, according to the descriptors, an element in the storage system is allowed to be changed.

In another general aspect, a system for maintaining data in a data management system includes means for accessing a first data source providing one or more source elements of data; means for accessing a storage system storing one or more subsets of data, each subset including at least one element of data, and storing one or more descriptors identifying a data source for a subset and identifying a data source for each element of the subset; and means for processing rules that determine if, according to the descriptors, an element in the storage system is allowed to be changed.

In another general aspect, a computer program for maintaining data in a data management system, stored on a computer-readable medium, includes instructions for causing a computer to access a first data source providing one or more source elements of data; access a storage system storing one or more subsets of data, each subset including at least one element of data, and storing one or more descriptors identifying a data source for a subset and identifying a data source for each element of the subset; and process rules that determine if, according to the descriptors, an element in the storage system is allowed to be changed.

Aspects can include one or more of the following features.

At least one rule determines if, according to at least one descriptor, any of the source elements is to be used to replace an element in the storage system.

At least one rule determines if, according to at least one descriptor, an element in the storage system is to be deleted in response to a corresponding source element being deleted.

A second data source is accessed, providing one or more source elements of data different from the source elements provided by the first data source.

The first data source is the data source for the subset and the second data source is the data source for at least one of the elements of the subset.

At least one of the descriptors identifies a data source for a subset and at least one other descriptor identifies another data source for an element of the subset.

At least one of the rules requires user input.

At least one of the rules is handled automatically, without user input.

A maintenance plan is accessed containing the rules.

The maintenance plan includes a mapping indicating which source elements correspond to which elements in the storage system.

The first data source includes a user interface accepting direct user input.

The data includes records that each store data elements in multiple fields.

A descriptor identifies a record owner that controls changes to a given record.

The record owner controls deletion of the given record.

The record owner created the given record.

A descriptor identifies a field owner that controls changes to a data element stored in a given field of a given record.

The field owner controls updates to the data element stored in the given field.

A user interface is provided to a user and accepts decisions from the user that relate to the storage system data elements.

Aspects of the invention can include one or more of the following advantages.

A data maintenance system is able to handle multiple data sources, which potentially overlap in terms of the data they contribute to a unified data collection, and which potentially are diverse in structure. The data maintenance system is able to keep track of the sources that contribute to an element in the system. The system is able to manage different sources, which may contribute different versions of the element over time, and the system is able to make a determination as to which source contents should be used to modify the version of the element in the storage system. Further, if an element has been deleted from its authoritative source, the system is able to determine that this deletion represents a substantive change in the data.

Other features and advantages of the invention will become apparent from the following description, and from the claims.

DESCRIPTION

1 Overview

Figure 1:
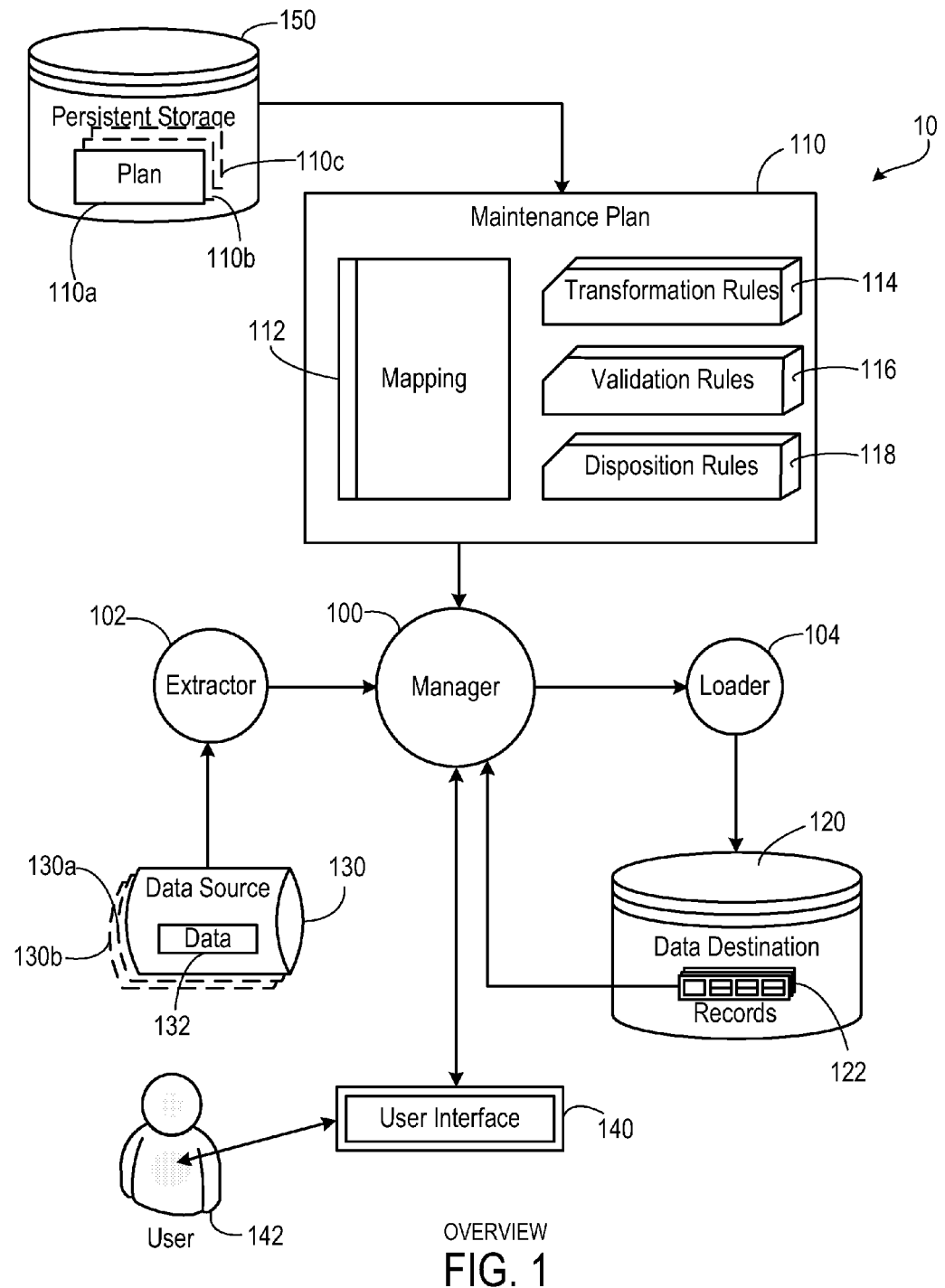
FIG. 1 is an overview of a data maintenance system.

FIG. 1 is a block diagram of an exemplary data maintenance system 10 showing the interrelationship between elements of the system 10. A data manager 100 accepts multiple inputs for the purpose of providing data to be loaded into a data destination 120. For example, the data maintenance system can be used for implementing a repository for metadata that is used by a data processing system to describe various data processing programs, various sources of data, and various results of processing the data from the sources using the programs. In that case, the data maintenance system is able to extract information from various sources to form the metadata and to maintain a unified view of the data processing system and its history of processing various kinds of operational data.

One input to the data manager 100 arrives by way of an extractor 102, which is capable of acquiring data 132 from one or more data sources 130, 130a, 130b. The extractor provides one or more such sources to the manager 100.

Another input is a data maintenance plan 110. Generally, each data source 130 has a corresponding maintenance plan, which may be unique to that particular source, or shared among several sources. The plan includes a mapping 112 of source data elements to destination data elements. Further, the plan includes transformation rules 114, validation rules 116, and disposition rules 118 for handling different aspects of processing the data. The rules address situations that can arise during the processing of a particular source, such as the formatting of an element value in the source, the addition of an element to a source, and the removal of an element from a source. Further, the rules also allow or deny modification of an element in the data destination, depending on the source of that modification. Multiple maintenance plans 110a, 110b, 110c are placed in persistent storage 150 for multiple uses over time.

Another input arrives by way of a user interface 140. In some situations, the manager 100 functions autonomously and requires no user interface input. In other situations, a user 142 initiates manager action, for example, by clicking a button. In some situations, the manager 100 may also require user input to proceed beyond a decision-making point, or may have information to provide to a user. In these various cases, the user interface 140 acts as a conduit between the user 142 and the manager 100.

Another input comes from the data destination 120. The data destination 120 stores data elements according to a given format for a given type of data structure. For example, in some implementations, data elements correspond to values stored in records 122 composed of multiple fields. Each field value (or "property" value) for a given record (e.g., such as a cell in a table for records stored in a table) can have an associated field owner, which identifies the data source that determines some types of changes to the element stored in that field. For example, data from the field owner is allowed to be used in changing or deleting the element stored in that field. Further, each record (e.g., such as a row in a table for records stored in a table) can have an associated record owner, which identifies the data source that determines some types of changes to the record. For example, the record owner of a record may be the data source that created the record, and the field owner of a field may be the data source that supplied an initial value for the field. The record owner can control the deletion of the record and its associated fields. In this example, if the record is removed from the data source identified as the record owner, the corresponding record can removed from the data destination, or the record owner can otherwise determine when it is permissible to delete a record. Similarly, the field owner can control updates to a value in a field. In some implementations, data elements correspond to the data stored within versioned data object (e.g., where the data object can correspond to multiple records representing different versions of the data object). Once the manager 100 has identified which elements in the data destination 120 are to be accessed for modification, the manager 100 accepts as input the record owner of each record, and (optionally) the field owner of each element. Because a given record can be associated with a given record owner and a specific field of the given record can be associated with a given field owner, a given element stored in the given field of the given record may have one data source specified as record owner and another data source specified as field owner.

Upon accepting the inputs, the manager 100 applies the maintenance plan 110 to the data 132 extracted from the data source 130. The maintenance plan 110 includes the mapping 112, which indicates which elements of data arriving from the data source correspond to which elements in the data destination 120. Once the manager 100 has determined which elements are to be placed into the data destination 120, the manager 100 applies the transformation, validation, and disposition rules to each element. The disposition rules are applied in view of the record and field owner of each element. Particular rules will determine the course of action if the source of an element does not correspond to the record owner or field owner of that element. For example, if the field owner is not the same data source as the data source providing a change or update to the field, a disposition rule may indicate the course of action to take.

During processing, the manager 100 may provide output to the user interface 140 in the form of status messages, and may accept further input in the event that a user must make a decision as to how to proceed with a given data element.

Once the manager 100 has applied the rules to the data elements, the manager 100 provides the elements to a loader 104 for the purpose of placing them in the data destination 120.

2 Data Storage

Data can come from any of multiple types of sources. Frequently, data comes from an external source. For example, data might be stored in an external database or spreadsheet file. Alternatively, data could be entered manually by a user via a user interface provided by a data storage system (e.g., a data storage system implementing the data destination 120). The data maintenance system is capable of maintaining data that arrives from a wide variety of types of sources, including those enumerated here.

The data is likely to change over time. Thus, as part of maintaining an up-to-date data storage system, the system is updated regularly with the latest version of data in each respective source.

Figure 2:
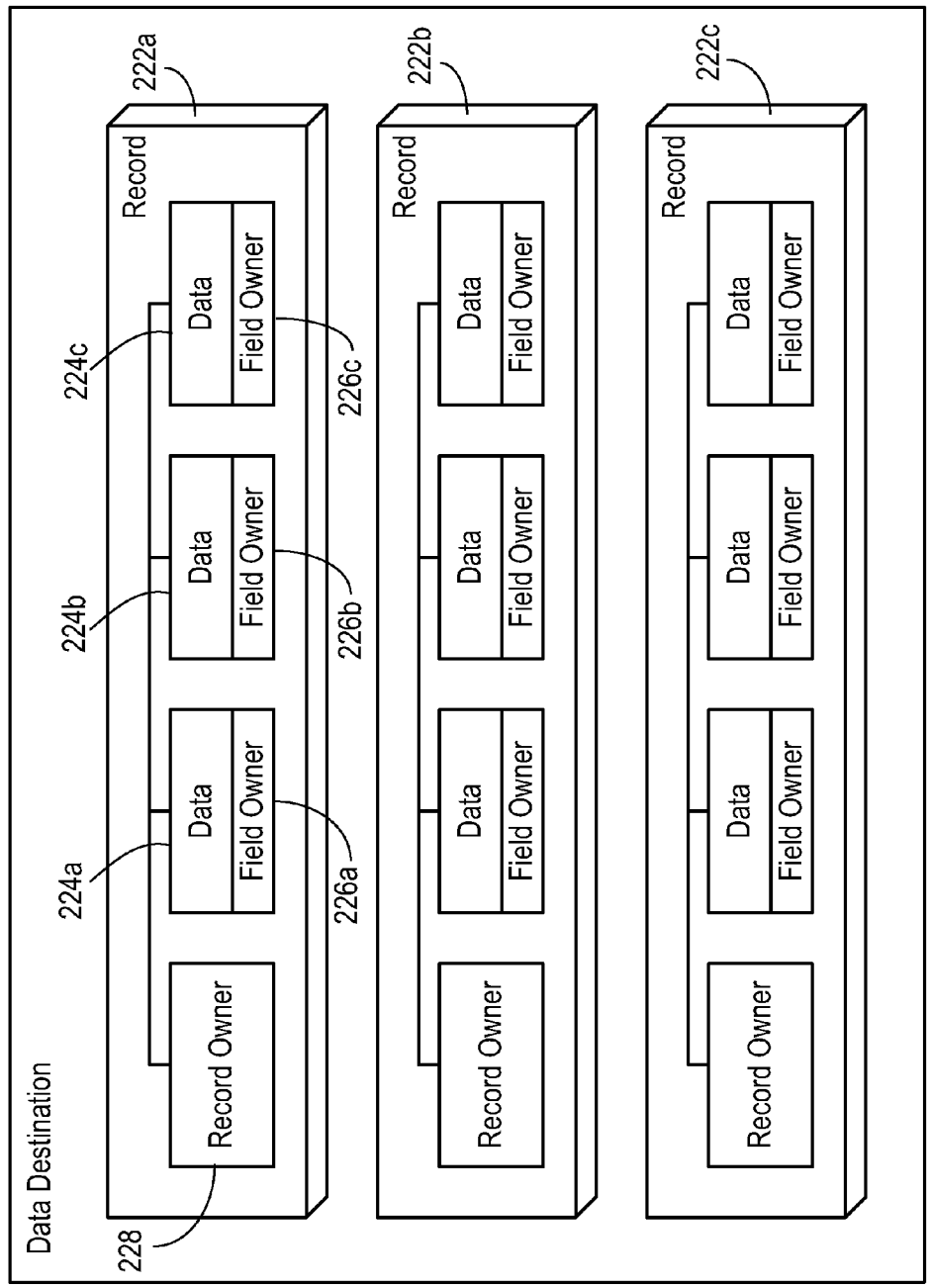
FIG. 2 is a diagram of some of the contents of a data destination.

An exemplary data storage system that implements the data destination 120 stores collections of data in the form of database tables. FIG. 2 shows one representation of a database table. The system stores records such as records 222a, 222b, 222c corresponding to discrete subsets of data. Further, the records contain one or more fields 224a, 224b, 224c corresponding to different aspects of each subset of data. All of the records in a collection contained in the storage system may come from the same source, or some records may come from one source and other records may come from other sources. Similarly, all of the fields in a record may come from the same source, or different sources may contribute different fields to the same record.

As a function of maintaining data derived from multiple data sources, the data maintenance system identifies the data source of each element. The system uses this information to determine whether a particular data source should be used to change a given element (e.g., changes such as updating, modifying, or deleting a given element), or to determine instead if the particular data source would be unsuitable for this purpose. This may include permitting direct edits of some data through the user interface 140, while warning about or preventing user interface edits to other data elements that have a data source specified as an owner (e.g., a data source external to the system or a data source that the user does not have permissions to override). Further, if a user wishes to modify an externally maintained data element, the system can use the data source information to route change requests to the appropriate external data source. Some techniques to use this source information involve maintaining a set of descriptors in the form of owners.

For example, in some implementations, each field has an associated field owner 226a, 226b, 226c, which identifies the data source that is allowed to be used in changing or deleting the element stored in that field. In some implementations, the field owner is the data source that governs changes or updates to the element stored in the field. For example, the underlying data in the element may have changed, or there may be additional data supplied for the element besides the data already present. Further, each record also has an associated record owner 228, which identifies the data source that controls changes to that record. For example, in some implementations the record owner controls whether or not the record is allowed to be deleted. The owner information can be stored alongside the associated data records in the storage system. Once the manager has identified which elements in the data destination are to be accessed for modification, the manager accepts as input the record owner and field owner of each element. A given element stored in a given field of a given record may be associated with a field owner of the given field and a different record owner of the given record. The record owner and field owner can also be the same data source. An element is also capable of having an undefined field owner or undefined record owner.

Some implementations may contain further information about each data element. For example, the data maintenance system may also retain information about the temporal status of each element. The system could record the time that the element in the data destination was last modified by a data source. Similarly, the system could record the time that the original source element was last modified in the data source itself.

3 Data Mapping

For each source that provides data to the data maintenance system, there is a corresponding mechanism for identifying which data elements in the source correspond to which data elements in the destination. A data storage system implementing the data destination stores data in a particular arrangement, which is usually different than the arrangement that a given source stores data. Further, as noted above, a complete set of data is frequently derived from multiple data sources. Some data describing a given aspect of a dataset may reside in one source, and some data describing a different aspect of that same dataset may reside in a different source. These differing sources may each have their own manner of arranging data.

Figure 3:
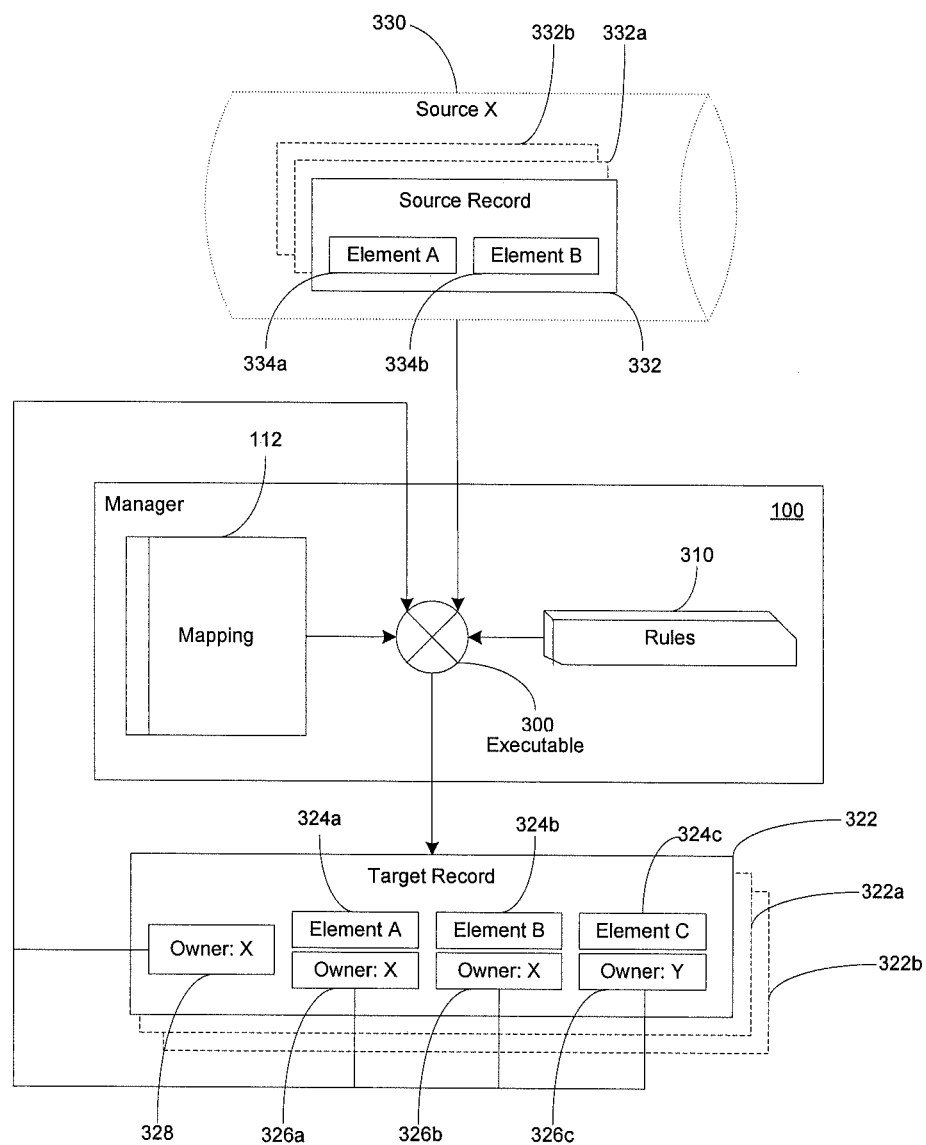
FIG. 3 is a diagram of the components involved in processing data.

The data manager 100 is capable of mapping each element of data in a data source to a corresponding element in the data destination 120, as seen in FIG. 3. To accomplish this, each data source 330 has an associated stored mapping 112 as a component of its associated maintenance plan. The mapping 112, as well as maintenance plan rules 310, are used by an executable portion 300 of the data manager 100. When source elements 334a, 334b are prepared for inclusion in the data destination, the stored mapping 112 provides guidance to the manager 100 as to where each element should be placed in the data destination. Similarly, if the element is a new version of an older element, the mapping 112 provides guidance as to what older element will be removed and replaced by the new version.

Generally, the mapping 112 identifies source records 332, 332a, 332b in the data source 330 and the corresponding records 322, 322a, 322b in the data destination. Frequently, each element in a source record 332 will be placed in the corresponding target record 322 in the data destination. Alternatively, depending on the arrangement of data in the data source 330, some of the elements in a source record 332a will be placed in one target record 322a, and some of the other elements in the source record 332a will be placed in a different target record 322b. Further, not all of the elements in a source record 332 need be mapped to a target record 322.

The target record may also contain elements from multiple data sources. Some elements 324a, 324b may originate from one source, and at least one other element 324c may come from a different source. Generally, the data destination has a descriptor identifying multiple sources. The record owner 328 can indicate the data source that provided the original data elements included in the target record when the target record was first created in the data destination. A record may have an undefined record owner. In some implementations, whether or not a data source is considered the record owner is controlled by disposition rules. The field owners 326a, 326b for those original data elements can also correspond to that original data source. If an element 324c originated from a different source, the corresponding field owner 326c can indicate that different source. Optionally, the mapping associated with the different source can indicate that the record itself containing that element will not be present in the data destination, but rather that only a subset of its elements will be present in the data destination. Further, one or more of the elements 324a, 324b, 324c may uniquely identify the record and should be assigned a field owner equal to the record owner.

The data manager 100 uses the owner information to evaluate whether or not a given element should be added, removed, or updated by an importing data source attempting to change the given element (e.g., by comparing the owner information to the identity of the importing data source). Accordingly, the owner information and identity of the importing data source are accepted as input by the executable portion 300 in order to make these evaluations.

4 Data Rules and Processing

Figure 4:
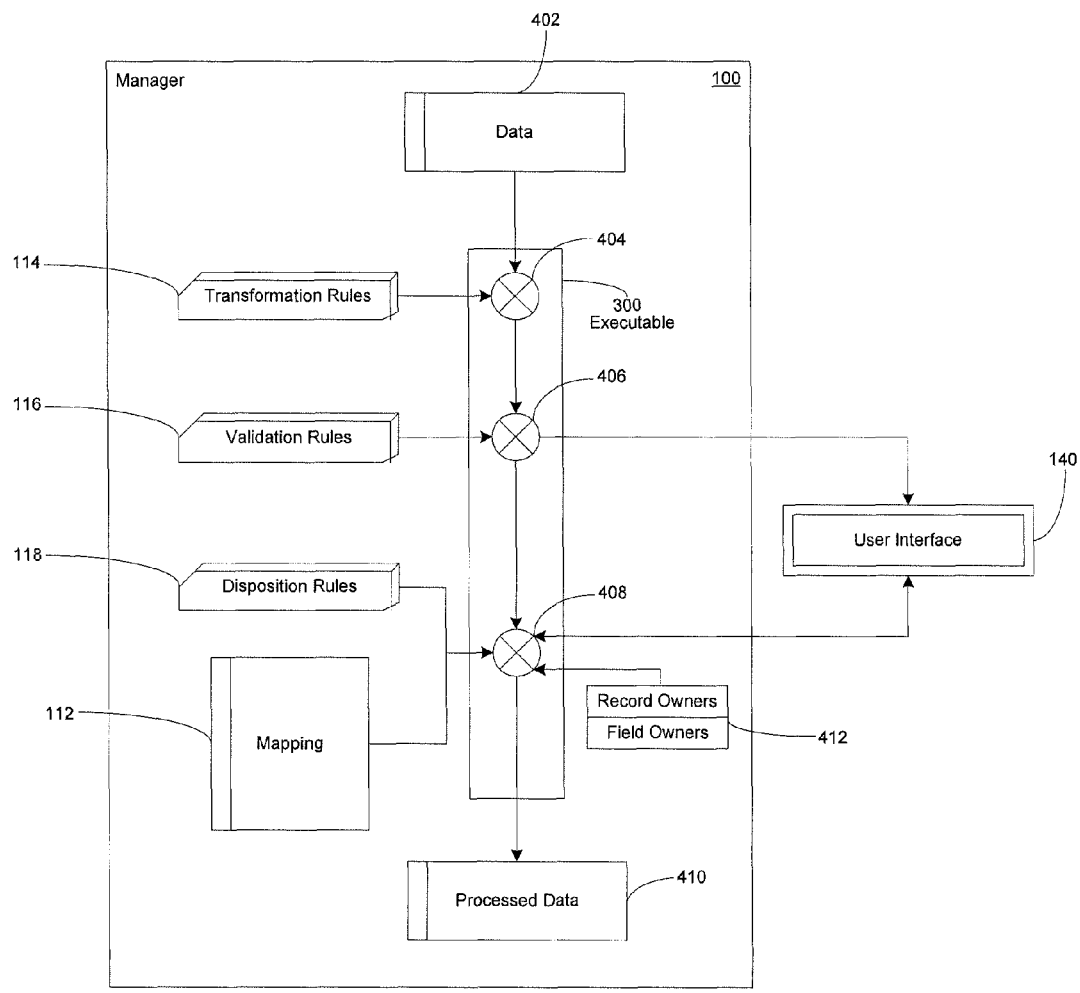
FIG. 4 is another diagram of the components involved in processing data.

Another component of the maintenance plan 110 associated with a data source 330 is a set of rules 310. These rules alter the data undergoing processing to put them in a condition appropriate for loading into the data destination. As seen in FIG. 4, each rule belongs to the set of transformation rules 114, validation rules 116, and disposition rules 118, depending on the aspect of a data element that the rule affects. The data manager 100 directs incoming data 402 through an executable portion 300, which performs operations sequentially according to each set of rules. The transformation rule executable portion 404 takes the incoming data 402 as input and provides transformed data as output. Next, the validation rule executable portion 406 takes the transformed data as input and provides validated data as output, and also provides any error notifications to the user interface 140 if any invalid data is encountered. Finally, the disposition rule executable portion 408 takes the validated data as input, as well as the mapping 112 associated with the source of the data, and the record and field owner descriptors 412 pertaining to the incoming data elements. Each of the executable portions 404, 406, 408 is optional in that data can be passes along without performing any action if there are no corresponding rules to process. Also, the order of the executable portions 404, 406, 408 can be different in other implementations. Depending on the circumstances, the disposition rule executable portion 408 may provide output to and receive input from the user interface 140 if a user decision is required by one of the disposition rules 118, for example. This executable portion 408 outputs fully processed data 410 for eventual inclusion in the data destination 120.

Transformation Rules

Besides the aforementioned differences in arranging elements, a given data source may store an individual element in a particular format, whereas the data destination may store that same element in a different format. The data manager 100 can automatically transform this element from the first format to the second while it is undergoing processing. For example, a data source may store text in all uppercase, while the data destination ideally stores text in all lowercase. The data manager 100 applies transformation rules to carry out these automatic changes. A transformation rule may apply to a particular element from a particular source, or the rule may apply to any number of elements from any number of sources.

Validation Rules

The mechanism also determines if a data element is appropriate for inclusion in the data destination. Some data may need to be in a certain format or within a certain range to be meaningful. For example, a data element representing a calendar date must have components corresponding to a month, day, and year, and a month in the range of 1-12 and a day in a range such as 1-31. The data manager 100 applies validation rules to each element undergoing processing to determine if the element is in a valid form in the context of that element. A validation rule may apply to a particular element from a particular source, or the rule may apply to any number of elements from any number of sources.

Disposition Rules and Source Management

Over time, the composition of a data source may change in a significant fashion. As a matter of course, elements can be expected to change over time. Further, elements may be added and removed. Each case corresponds to a different course of events in the data source, depending on the context. In the event that an element in a data source has simply changed relative to the element contained in the data storage system, the real-world information associated with the element has likely also changed, and so the element has simply been updated accordingly. However, when multiple data sources are making contributions to the same set of data, this particular data source might represent an older version of the data than currently represented in the data destination.

Further, a data element may be missing because the data that the element concerns no longer exists, and so the element has been intentionally deleted. Alternatively, the data element may have been contributed by a different data source, or has been moved to a different data source. Or, the data element may still exist in this data source, but under some other identity.

Similarly, the addition of a data element can represent a scenario that parallels one of the scenarios related to the deletion of an element. The added element may be new information about data, or the element may be an existing piece of data that now resides at a new location or under a new identity.

The data manager 100 is able to use disposition rules to handle all of these types of changes in the composition of a data source. Each rule handles a particular type of change. A rule can automatically initiate a predefined action, such as removing an element from the data storage system. Alternatively, a rule can prompt for further decision-making by a user. In this regard, the disposition rules differentiate scenarios that can be handed automatically, and scenarios that receive input from a user.

The disposition rules can also handle priority conflicts among multiple data sources. In particular, a disposition rule can rely on the owner of a given element to determine an appropriate course of action. When ownership information is being used with a disposition rule, a data source can only be used to update or delete a particular element in the data destination if allowed by a disposition rule, according to the ownership of the element. For example, in some cases, a data source must be defined as an owner of an element if the element is to be used in performing an update. If the data source is not an owner, the data manager 100 will apply that element's associated disposition rule to take a proper course of action. The rule may indicate that the element should not be updated. Alternatively, the rule may indicate that this data source is to be assigned the new owner of the element, and so the update may proceed. Another type of rule may indicate that if the field owner is undefined, the data source can be used to update the field even though the data source is not the field owner.

The disposition rules can also initiate changes in element ownership. For example, if a data source will no longer be used to modify an element after a certain time, a disposition rule can indicate that the element's field owner should be set to another data source, or left undefined for another data source to claim ownership.

A disposition rule may apply to a particular element from a particular source, or the rule may apply to any number of elements from any number of sources.

5 Establishing Maintenance Plans

Figure 5:
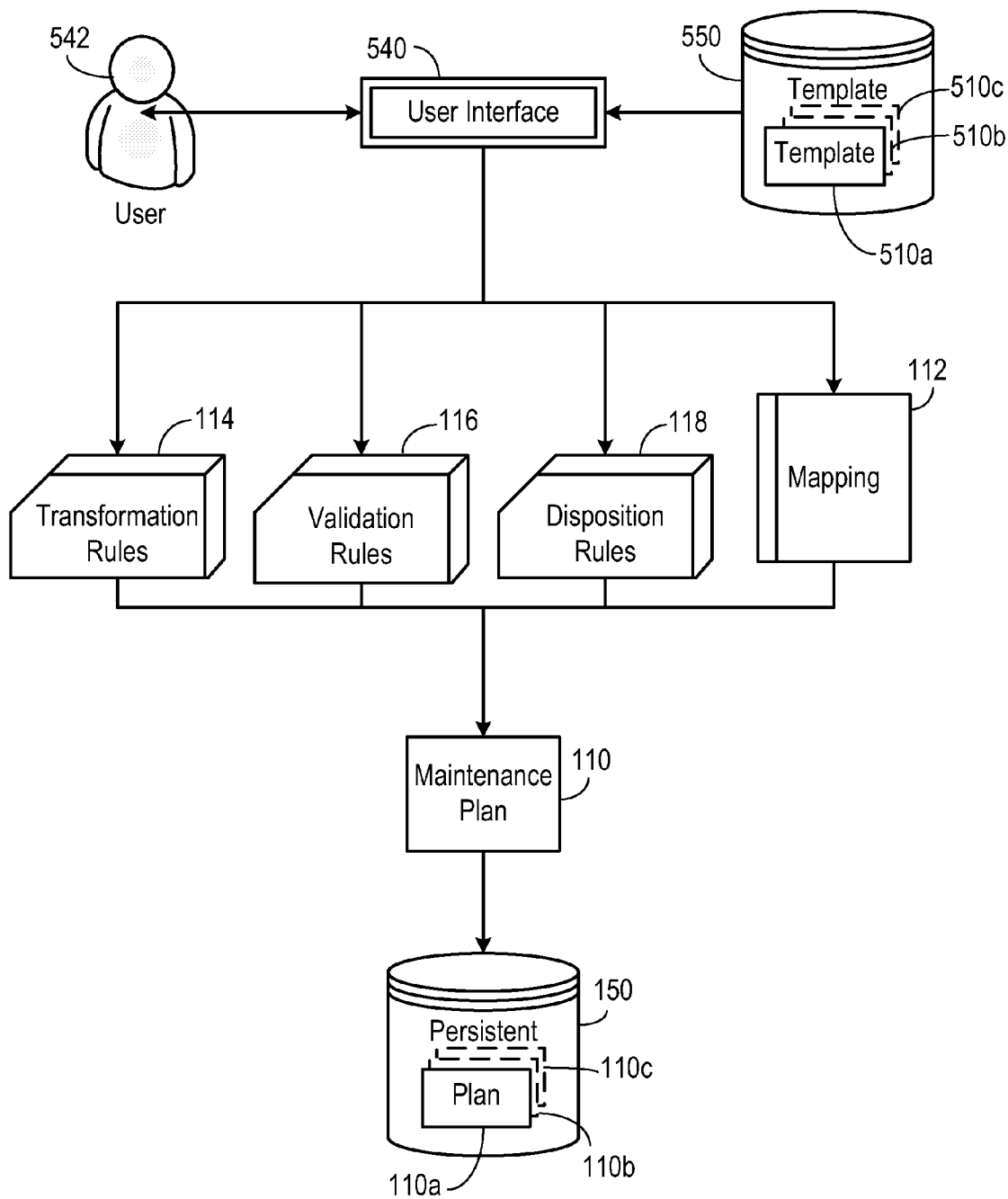
FIG. 5 is a diagram of a system for creating a data maintenance plan.

The data storage system has a mechanism for creating a given maintenance plan associated with a given data source. FIG. 5 shows an example of the portion of the system providing this functionality. A user 542 accesses a user interface 540 to create a plan. This user can be the same as the user 142 who operates the data manager 100. Similarly, the user interface 540 can be a component of the user interface 140 used to interact with the data manager 100.

The user interface 540 is used to define the transformation rules 114, validation rules 116, and disposition rules 118, as well as the mapping 112. Together, these comprise the maintenance plan 110, which is placed in persistent storage 150 with existing maintenance plans 110a, 110b, 110c. The maintenance plan 110 may optionally be based on one of several maintenance plan templates 510a, 510b, 510c provided to the data storage system in a template storage 550. These templates correspond to common types of data source file formats. Alternatively, the maintenance plan 110 can be created anew in the user interface 540.

6 Exemplary Operation

Figure 6A:
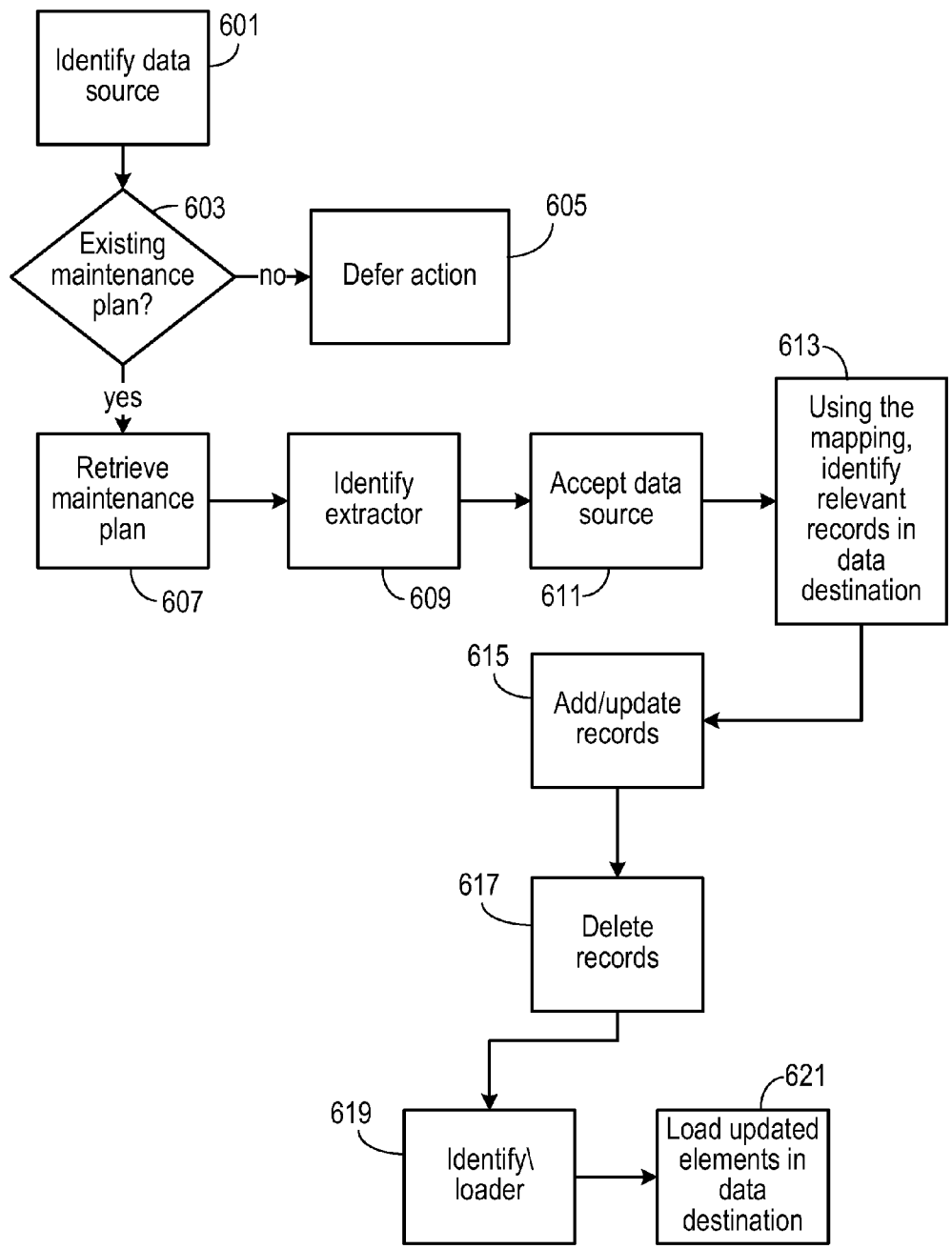
FIG. 6A is a flowchart of operation for a data manager.
Figure 6B:
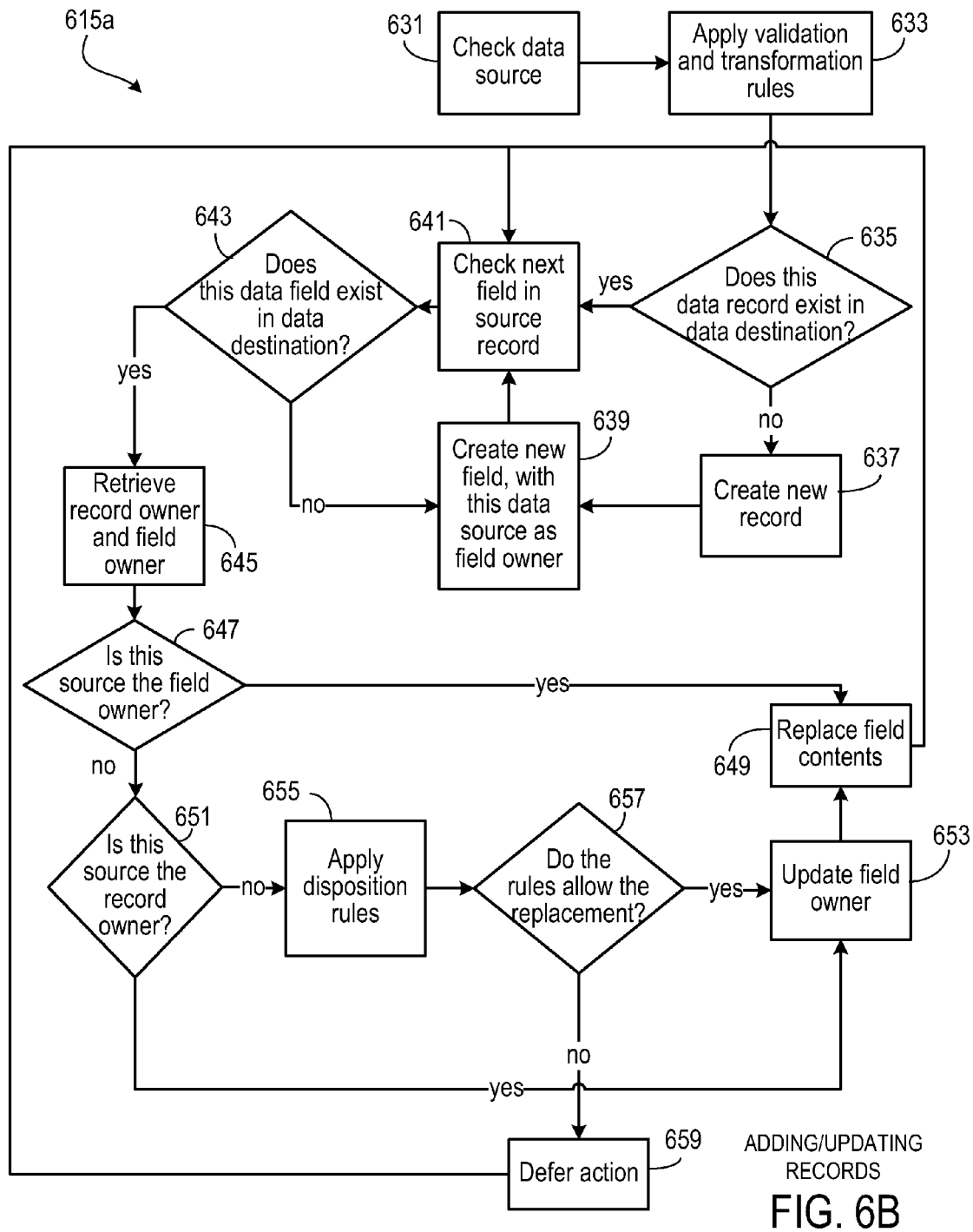
FIG. 6B is a flowchart of operation for a portion of a data manager.
Figure 6C:
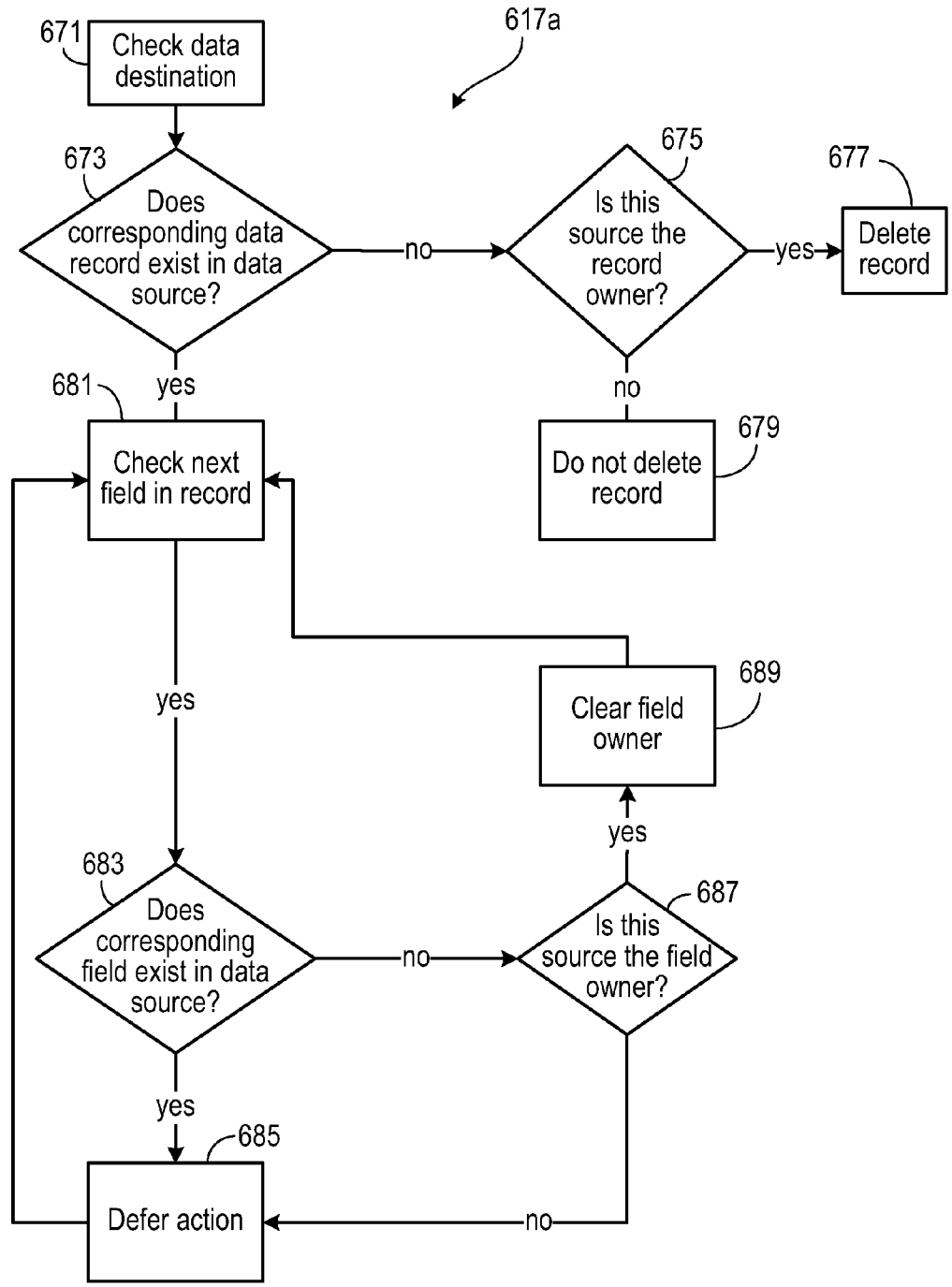
FIG. 6C is a flowchart of operation for another portion of a data manager.

One possible sequence of operation for the data manager is shown in FIGS. 6A-6C. Referring to FIG. 6A, in step 601, the data source to be processed is identified. In step 603, the manager determines if this source has an existing maintenance plan. If not, in step 605, the manager postpones action until a plan is created. If there is a maintenance plan, in step 607, the manager acquires the plan from persistent storage. In step 609, the manager identifies an extractor to use to acquire the data in the data source. This extractor could be specified by the maintenance plan, or by another mechanism. In step 611, the manager accepts the data source from the extractor. In step 613, the manager uses the mapping from the maintenance plan to determine which records in the data source are relevant to which records in the data destination. In step 615, each relevant record is added or updated in the data destination, in accordance with the data source and maintenance plan. Step 615 can take place as multiple iterations, with an iteration corresponding to a record. In step 617, records in the data destination are identified for deletion if dictated by the data source and maintenance plan. This step can also take place in the form of multiple iterations. Next, in step 619, the manager optionally identifies a loader to be used to load the changed data into the data destination, for example, if the changed data was not loaded in step 615 (e.g., if the records operated upon were cached copies or temporary copies). The loader could be specified by the maintenance plan, or by another mechanism. Finally, in step 621, the added, updated, and deleted records are updated in the data destination.

FIG. 6B details example iteration 615a of step 615, the process of adding or updating a record in the data destination. In step 631, the manager checks the data source for a record, using the mapping to determine if the data source has records that may correspond to records in the data destination. In step 633, the manager applies the validation and transformation rules to the contents of the record. In step 635, the manager determines if the data destination has a record that corresponds to this source record, based on the mapping in the maintenance plan. If the destination does not have a corresponding record, in step 637, the manager creates a new record, in some cases, with this data source set as record owner. In some cases, the record owner will be undefined, or a different data source will be set as record owner. The mapping may indicate that the record should already exist, but with a different source as record owner, and so the manager has the option of leaving the different source as record owner. In step 639, the manager creates the first field of the record based on the first field in the data source record, with the data source set as field owner. In step 641, the manager checks for the next field in the source record, if any. In step 643, the manager determines that there is no corresponding field in the data destination, since this is a newly-created destination record. The sequence of operation returns to step 639, until all fields have been created for this record. The manager may also create placeholder fields if the mapping indicates the fields should exist, but the data has not yet been acquired by the manager.

If, in step 635, the manager determined there was a corresponding record in the data destination, the manager identifies a field in the source record for processing, in step 641. In step 643, the manager determines if there is a corresponding field in the destination record. If there not a corresponding field, the manager follows a similar procedure as if the record were new, creating a new field with this data source as the field owner, and containing the contents of the source field. If the manager determines in step 643 that there is a corresponding field in the data destination, the manager retrieves the pertinent record owner and field owner, in step 645. In step 647, the manager checks to see if this data source is the field owner, or if the field owner is currently undefined. If so, in step 649, the manager replaces the contents of the field with the data from the source, and returns to step 641. However, if the data source is not the field owner, some implementations of the manager check to see if the data source is the record owner, in step 651. If so, the manager updates the field owner to this data source, in step 653. In this situation, the record owner has presumably taken over ownership of this field and is updating it with its own data accordingly. The data source may also be claiming ownership of a record with an undefined record owner. The manager then replaces the field contents in step 649. However, if this data source was neither the record owner nor the field owner, the manager applies the disposition rules to determine what further action to take, in step 655. Further, in some implementations, the manager does not use the record owner to update the contents of a field. In these implementations, if the data source is not the field owner, the manager applies the disposition rules in step 655, skipping step 651. The application of the disposition rules may require any number of other sub-steps, including querying a user for a decision through the user interface. To handle priority conflicts between multiple data sources, the disposition rules may also be used to compare relative priority between the existing field owner and the current data source when updating a field. In step 657, the manager takes the appropriate action in accordance with the disposition rules. If the rules allow this data source to modify the field, the manager updates the field owner in step 653, and replaces the field contents in step 649. Depending on the particular disposition rules defined for this data source, or the configuration of the manager, some implementations may forgo changing the field owner, or alternatively, also update the record owner. If the disposition rules do not allow this data source to modify the field, the manager takes no action in updating the field, in step 659, and returns to step 641. Step 659 may optionally include an error message or error log entry.

FIG. 6C details example iteration 617a of step 617, the process of deleting a record or field in the data destination. In step 671, the manager checks the data destination for a record, using the mapping to determine if the data destination has records or fields corresponding to records or fields potentially missing from the data source. In step 673, the manager determines if a given record that exists in the data destination also exists in the data source. If not, in step 675, the manager checks the record owner. If this data source is the record owner, the record is slated for deletion in the data destination, in step 677. This may indicate, for example, that the record existed in the data source but was recently deleted, and so the data destination should be updated accordingly. If this data source is not the record owner, the record is not deleted, in step 679. This may indicate, for example, that the record still exists in another data source that is this record's owner.

If, in step 673, the manager determined that the record in the data destination had a corresponding record in the data source, the manager identifies and accesses a field in the destination record, in step 681. In step 683, the manager determines if there is a corresponding field in the data source.

If so, the manager defers action on the destination field, in step 685. If the manager determines that there is no source field that corresponds to the destination field, however, the manager checks the field owner, in step 687. If this data source is designated as the field owner of the destination element, yet the field is absent from the data source, then the manager removes this data source as the field owner, in step 689. With no field owner set, the system can later remove the contents of this field, or another data source can later claim ownership of the field and update the field contents. If this data source is not the field owner, the manager defers action on the field, in step 685.

7 Exemplary Implementation

The data maintenance approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method for maintaining data in a data management system including at least one processor and a storage system, the method including:
   accessing a storage system storing a table, the table including one or more records, each record including at least one field that contains data, and storing two or more descriptors, at least some of the descriptors each comprising data identifying a data source for a record and at least some of the descriptors each comprising data identifying a data source for each of one or more fields of the record; and
   determining if, according to the descriptors and based at least in part on an identity of a first data source providing one or more source elements of data, at least one field in one of the records of the table is allowed to be changed in response to receiving the source elements of data from the first data source;
   at least one descriptor identifying a record owner that governs changes to a particular record of the table, and
   at least one other descriptor identifying a field owner different from the record owner, the field owner governing changes to a data element stored in a particular field of the particular record of the table.

2. The method of claim 1 including determining if, according to at least one descriptor, any of the source elements is to be used to replace an element in the storage system.

3. The method of claim 1 including determining if, according to at least one descriptor, an element in the storage system is to be deleted in response to a corresponding source element being deleted.

4. The method of claim 1 including accessing a second data source providing one or more source elements of data different from the source elements provided by the first data source.

5. The method of claim 4 wherein the first data source is the data source for the record and the second data source is the data source for at least one of the fields of the record.

6. The method of claim 4 wherein the one or more source elements of the first data source and the one or more source elements of the second data source are each mapped to one or more destination data elements, and wherein the field is determined to be allowed to be changed based on the mapping.

7. The method of claim 6 wherein the one or more destination data elements each correspond to one or more fields in the records, and the mapping corresponds to the data identifying a data source of the one or more descriptors.

8. The method of claim 1 wherein at least one of the descriptors identifies a data source for a record and at least one other descriptor identifies another data source for a field of the record.

9. The method of claim 1 wherein determining requires user input.

10. The method of claim 1 wherein the first data source includes a user interface accepting direct user input.

11. The method of claim 1 wherein a descriptor identifies a record owner that controls changes to a given record.

12. The method of claim 11 wherein the record owner controls deletion of the given record.

13. The method of claim 11 wherein the record owner created the given record.

14. The method of claim 1 wherein a descriptor identifies a field owner that controls changes to a data element stored in a given field of a given record.

15. The method of claim 14 wherein the field owner controls updates to the data element stored in the given field.

16. The method of claim 1 including providing a user interface to a user and accepting decisions from the user that relate to the storage system data elements.

17. The method of claim 1 including transforming the element in the storage system from a first format to a second format.

18. The method of claim 1 wherein determining if the field can be changed comprises determining if data in the field in the storage system is in a valid form in the context of that field.

19. The method of claim 1 including changing the composition of the element received from the first data source.

20. The method of claim 1 wherein determining if the field is allowed to be changed is based on processing one or more rules.

21. The method of claim 20 wherein at least one of the rules is handled automatically, without user input.

22. The method of claim 20, including accessing a maintenance plan containing the rules.

23. The method of claim 22 wherein the maintenance plan includes a mapping indicating which source elements correspond to which elements in the storage system.

24. The method of claim 1 including determining that the identified field owner is different from the identified record owner.

25. A system for maintaining data, the system including:
a storage system including at least one computer readable storage device, the storage system storing
a table, the table including one or more records, each record including at least one field that contains data, and
two or more descriptors, at least some of the descriptors each comprising data identifying a data source for a record and at least some of the descriptors each comprising data identifying a data source for each of one or more fields of the record; and
a processor configured to execute a data manager, the data manager configured to determine if, according to the descriptors and based at least on part on an identity of a first data source providing one or more source elements of data, at least one field in one of the records of the table is allowed to be changed in response to receiving the source elements of data from the first data source;
at least one descriptor identifying a record owner that governs changes to a particular record of the table, and
at least one other descriptor identifying a field owner different from the record owner, the field owner governing changes to a data element stored in a particular field of the particular record of the table.

26. The system of claim 25 wherein the data manager is configured to determine if, according to at least one descriptor, any of the source elements is to be used to replace an element in the storage system.

27. The system of claim 25 wherein the data manager is configured to determine if, according to at least one descriptor, an element in the storage system is to be deleted in response to a corresponding source element being deleted.

28. The system of claim 25 including a second data source providing one or more source elements of data different from the source elements provided by the first data source.

29. The system of claim 28 wherein the first data source is the data source for the record and the second data source is the data source for at least one of the fields of the record.

30. The system of claim 28 wherein the one or more source elements of the first data source and the one or more source elements of the second data source are each mapped to one or more destination data elements, and the data manager is configured to determine if the field is allowed to be changed based on the mapping.

31. The system of claim 30 wherein the one or more destination data elements each correspond to one or more fields in the records, and the mapping corresponds to the data identifying a data source of the one or more descriptors.

32. The system of claim 25 wherein at least one of the descriptors identifies a data source for a record and at least one other descriptor identifies another data source for a field of the record.

33. The system of claim 25 wherein the data manager requires user input to determine if one of the fields can be changed.

34. The system of claim 25 wherein the first data source includes a user interface accepting direct user input.

35. The system of claim 25 wherein a descriptor identifies a record owner that controls changes to a given record.

36. The system of claim 35 wherein the record owner controls deletion of the given record.

37. The system of claim 35 wherein the record owner created the given record.

38. The system of claim 25 wherein a descriptor identifies a field owner that controls changes to a data element stored in a given field of a given record.

39. The system of claim 38 wherein the field owner controls updates to the data element stored in the given field.

40. The system of claim 25 including a user interface providing to the manager decisions of a user that relate to the storage system data elements.

41. The system of claim 25 wherein the data manager transforms the element in the storage system from a first format to a second format.

42. The system of claim 25 wherein the data manager determines if the element in the storage system is in a valid form in the context of that element.

43. The system of claim 25 wherein the data manager handles changes in the composition of the data source of the element in the storage system.

44. The system of claim 25 wherein the data manager is configured to determine if the field is allowed to be changed based on processing one or more rules.

45. The system of claim 44 wherein at least one of the rules is handled automatically, without user input.

46. The system of claim 44 wherein the data manager operates according to a maintenance plan containing the rules.

47. The system of claim 46 wherein the maintenance plan includes a mapping indicating which source elements correspond to which elements in the storage system.

48. The system of claim 25 wherein the data manager is configured to determine that the identified field owner is different from the identified record owner.

49. A system for maintaining data in a data management system, the system including a processor and a memory, the system including:
means for accessing a storage system storing a table, the table including one or more records, each record including at least one field that contains data, and storing two or more descriptors, at least some of the descriptors each comprising data identifying a data source for a record and at least some of the descriptors each comprising data identifying a data source for each of one or more fields of the record; and
means for determining if, according to the descriptors and based at least in part on an identity of a first data source providing one or more source elements of data, at least one field in one of the records of the table is allowed to be changed in response to receiving the source elements of data from the first data source;

at least one descriptor identifying a record owner that governs changes to a particular record of the table, and at least one other descriptor identifying a field owner different from the record owner, the field owner governing changes to a data element stored in a particular field of the particular record of the table.

50. A computer-readable storage device storing a computer program for maintaining data in a data management system, the computer program including instructions for causing a computer to:

access a storage system storing a table, the table including one or more records, each record including at least one field that contains data, and storing two or more descriptors, at least some of the descriptors each comprising data identifying a data source for a record and at least some of the descriptors each comprising data identifying a data source for each of one or more fields of the record; and determine if, according to the descriptors and based at least on part on an identity of a first data source providing one or more source elements of data, at least one field in one of the records of the table is allowed to be changed in response to receiving the source elements of data from the first data source;

at least one descriptor identifying a record owner that governs changes to a particular record of the table, and at least one other descriptor identifying a field owner that governs changes to a data element stored in a particular field of the particular record of the table; and determine that the identified field owner is different from the identified record owner.

51. The computer-readable storage device of claim 50, the operations including determining if, according to at least one descriptor, any of the source elements is to be used to replace an element in the storage system.

52. The computer-readable storage device of claim 50, the operations including determining if, according to at least one descriptor, an element in the storage system is to be deleted in response to a corresponding source element being deleted.

53. The computer-readable storage device of claim 50, the operations including accessing a second data source providing one or more source elements of data different from the source elements provided by the first data source.

54. The computer-readable storage device of claim 53 wherein the one or more source elements of the first data source and the one or more source elements of the second data source are each mapped to one or more destination data elements, and wherein the field is determined to be allowed to be changed based on the mapping.

55. The computer-readable storage device of claim 54 wherein the one or more destination data elements each correspond to one or more fields in the records, and the mapping corresponds to the data identifying a data source of the one or more descriptors.

56. The computer-readable storage device of claim 53 wherein the first data source is the data source for the record and the second data source is the data source for at least one of the fields of the record.

57. The computer-readable storage device of claim 50 wherein at least one of the descriptors identifies a data source for a record and at least one other descriptor identifies another data source for a field of the record.

58. The computer-readable storage device of claim 50 wherein determining requires user input.

59. The computer-readable storage device of claim 58 wherein the maintenance plan includes a mapping indicating which source elements correspond to which elements in the storage system.

60. The computer-readable storage device of claim 50 wherein the first data source includes a user interface accepting direct user input.

61. The computer-readable storage device of claim 50 wherein a descriptor identifies a record owner that controls changes to a given record.

62. The computer-readable storage device of claim 61 wherein the record owner controls deletion of the given record.

63. The computer-readable storage device of claim 61 wherein the record owner created the given record.

64. The computer-readable storage device of claim 50 wherein a descriptor identifies a field owner that controls changes to a data element stored in a given field of a given record.

65. The computer-readable storage device of claim 64 wherein the field owner controls updates to the data element stored in the given field.

66. The computer-readable storage device of claim 50, the operations including providing a user interface to a user and accepting decisions from the user that relate to the storage system data elements.

67. The computer-readable storage device of claim 50, the operations including transforming the element in the storage system from a first format to a second format.

68. The computer-readable storage device of claim 50 wherein determining if the field can be changed comprises determining if data in the field in the storage system is in a valid form in the context of that field.

69. The computer-readable storage device of claim 50, the operations including changing the composition of the element received from the first data source.

70. The computer-readable storage device of claim 50 wherein determining if the field is allowed to be changed is based on processing one or more rules.

71. The computer-readable storage device of claim 70 wherein at least one of the rules is handled automatically, without user input.

72. The computer-readable storage device of claim 70, the operations including accessing a maintenance plan containing the rules.

* * * * *